United States Patent
Espinoza-Ibarra et al.

(10) Patent No.: US 7,039,539 B2
(45) Date of Patent: May 2, 2006

(54) RACK EQUIPMENT ENVIRONMENTAL CONDITION ADJUSTMENT SYSTEM AND METHOD

(75) Inventors: Ricard Espinoza-Ibarra, Lincoln, CA (US); Kirk Michael Bresniker, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 227 days.

(21) Appl. No.: 10/681,720

(22) Filed: Oct. 7, 2003

(65) Prior Publication Data

US 2005/0075837 A1    Apr. 7, 2005

(51) Int. Cl.
   *G06F 19/00*     (2006.01)
   *G06F 15/00*     (2006.01)

(52) U.S. Cl. .................. 702/85; 702/182; 702/184; 702/186; 713/320

(58) Field of Classification Search .................. 702/85, 702/81, 82, 84, 182, 184, 186; 700/286, 700/291; 705/1, 63; 713/300, 320
See application file for complete search history.

(56) References Cited

U.S. PATENT DOCUMENTS

| 6,018,625 A * | 1/2000 | Hayball et al. ............... 703/22 |
| 6,785,592 B1 * | 8/2004 | Smith et al. ............... 700/291 |
| 2004/0255171 A1 * | 12/2004 | Zimmer et al. ............. 713/300 |

* cited by examiner

*Primary Examiner*—Bryan Bui (57) ABSTRACT

A rack equipment environmental condition adjustment system and method is presented. In one embodiment of the present invention, a rack equipment environmental condition adjustment system includes rack equipment for processing information. An environmental condition adjustment component adjusts the rack equipment based upon environmental conditions. A communication bus for communicatively coupling the rack equipment and the environmental condition adjustment component, wherein the communication bus communicates information between the environmental adjustment component and the rack equipment.

20 Claims, 4 Drawing Sheets

RACK EQUIPMENT ENVIRONMENTAL CONDITION ADJUSTMENT SYSTEM AND METHOD

FIELD OF THE INVENTION

The present invention relates to rack equipment management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the leveraged utilization of centralized resources by distributed network nodes. While leveraged utilization of centralized resources is usually advantageous, environmental conditions can have a significant impact on operations and maintenance of centralized rack equipment.

Centralizing certain resources within a distributed network typically provides desirable benefits. For example, centrally storing and/or processing information typically relieves the necessity of wasteful duplicative storage and/or processing resources at each remote networked node. However, managing large storage and processing capabilities of centralized resources is very complex and expensive. Clients interested in engaging a host to provide centralized resources and services typically have a desire to avoid providing the infrastructure, operation and maintenance directly themselves.

Centralized computing resource centers (e.g., server farms, Application Service Provider Centers, Internet Data Centers, Utility Data Centers, etc.) usually include a variety of equipment related to information processing mounted in racks. For example, a rack can include servers, routers, disk arrays, and operational support components (e.g., power distribution components, fans, etc.). The racks usually provide a convenient and efficient way to arrange computing equipment in a centralized operation location. The configurations of the rack structures usually follow conventional standards. However, the environmental conditions of the centralized locations can vary greatly, both between locations and within one location over time. Organizing and maintaining the infrastructure to support rack equipment for a variety of possible environmental conditions can raise many challenging operational issues.

Environmental conditions can have a variety of significant impacts on rack equipment operation and infrastructure support activities. For example, temperature usually has a significant effect on rack equipment operations. Rack equipment typically generates heat during operations and it is usually critical for rack equipment to be able to dissipate the heat. However, as Fourier's law of Heat Conduction indicates, the difference between the temperature of a rack equipment component and the environmental ambient temperature has a significant impact on the ability to dissipate heat. If sufficient heat is not dissipated the temperature of the various of the rack will constantly increase to intolerable levels (runaway thermal shock), causing the equipment to experience failures and/or produce erroneous results.

In addition to environmental conditions impacting rack equipment, it is also possible for traditional rack equipment to have detrimental impacts on the environment. Dissipating the heat from rack equipment can raise the temperature in the environment and thereby impact equipment in the same environment. In a typical centralized resource architecture there are usually numerous pieces of rack equipment concentrated in close proximity to one another and tend to exponentially increase the ambient temperature. In addition, rack equipment can raise the ambient noise level in an environment. The noise level of rack equipment can be unpleasant and distracting to humans in the area. Furthermore, centralized resource centers are often subject to a number of external constraints. For example, conventional centralized resource centers are often subject to regulatory requirements, such as numerous safety and health regulations that govern locations in which rack equipment is implemented. Again, noise level can reach a level and/or persistence that is detrimental to humans and regulatory requirements often mandate that the ambient noise level has to be maintained at a sufficiently low level when workers are in the area.

Attempting to address all the potential environmental problems that can arise is often complicated and complex. The sheer number of different possible problems and interaction of the different environmental conditions further complicates daunting environmental challenges. Traditional attempts at addressing environmental conditions are usually limited to fixed approaches in which the rack equipment is set to predetermined average settings. By setting the traditional systems to fixed average conditions they do not typically perform well in environmental extremes such as at high and low altitudes, cold and hot climates (e.g., Colorado, Amsterdam, Death Valley, and Tierra del Fuego, etc.). Some, traditional attempts at addressing environmental conditions usually involve running the equipment at lower fixed performance levels in order to reduce the impact of the environment. For example, even though a piece of equipment is capable of performing at a higher performance level it is maintained at a lower level based upon perceived possible environmental conditions (e.g., worst case) without consideration of actual environmental conditions.

Some traditional rack equipment may attempt to compensate for environmental conditions on an individual basis. However, environmental conditions often have a cumulative effect and changes in one component often impact other components. For example, inadequate heat dissipation can cause cascading failures in numerous pieces of rack equipment. Traditional attempts also often include limiting the amount of equipment placed in a rack well below the rack capacity. For example, even though a rack may be capable of holding several servers, only one is mounted in the rack. In addition, some conventional attempts include spreading equipment out to address the cumulative effects of temperature and noise or sound pressure associated with rack equipment operation. However, spreading the equipment out consumes precious centralized floor space.

Most of these prior attempts at addressing environmental issues are somewhat inflexible. Traditional collection, correlation, and analysis of environmental information manually is labor intensive and often requires a significant level of specialized knowledge and expertise. Manually adjusting the rack equipment usually requires the operator to have knowledge and understanding of unique features of each piece of equipment. The complexity and typical dynamic interaction of rack equipment tends to increase the probability of human error in making adjustments.

SUMMARY OF THE INVENTION

A rack equipment environmental condition adjustment system and method is presented. In one embodiment of the present invention, a rack equipment environmental condition adjustment system includes rack equipment for processing information. An environmental condition adjustment component adjusts the rack equipment based upon environmental conditions. A communication bus for communicatively coupling the rack equipment and the environmental condition adjustment component, wherein the communication bus communicates information between the environmental adjustment component and the rack equipment.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

Figure 1:
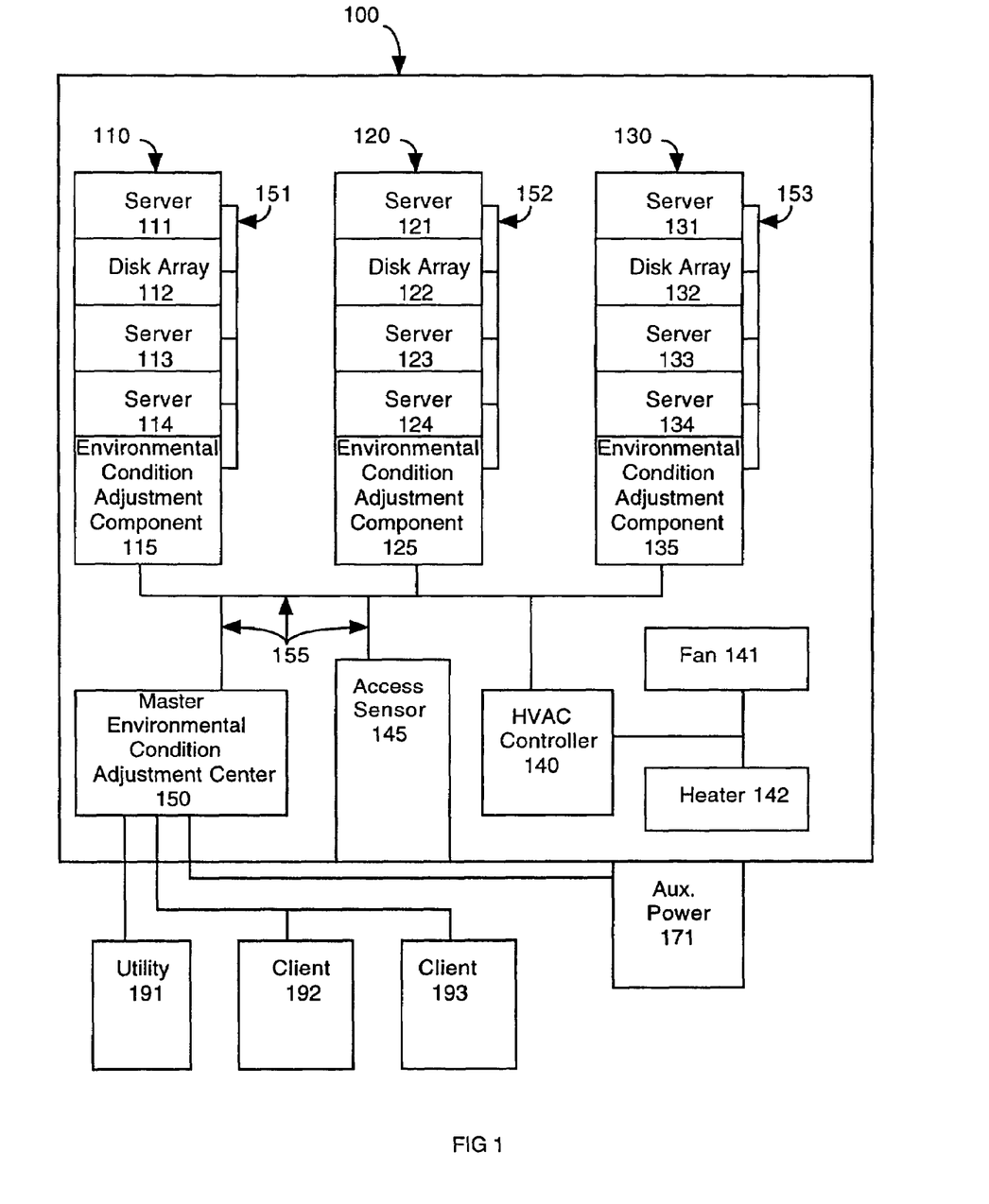
FIG. 1 is an illustration of rack equipment environmental condition adjustment system in accordance with one embodiment of the present invention.

FIG. 1 is an illustration of rack equipment environmental condition adjustment system 100, one embodiment of the present invention. Rack equipment environmental condition adjustment system 100 includes a plurality of racks 110, 120, and 130, master environmental condition adjustment component 150, access sensor 145, and heating, venting and air conditioning (HVAC) controller 140. Equipment racks 110, 120 and 130 comprise servers 111 through 134, disk arrays 112, 122 and 132, and management control units 115, 125 and 135 respectively. Master environmental condition adjustment component 150 is communicatively coupled to equipment racks 110, 120, and 130, access sensor 145, and HVAC controller 140 through communication channel 155.

The components of rack equipment environmental condition adjustment system 100 cooperatively operate to process information and adjust environmental conditions. The plurality of servers 111 through 134 process information. Disk arrays 112, 122 and 132 store information for processing. Environmental condition adjustment components 115, 125 and 135 adjust equipment included in equipment racks 110, 120, and 130 based upon environmental conditions. Master environmental condition adjustment component 150 coordinates the adjustment "between" racks 110, 120 and 130 and equipment (e.g., HVAC controller 140) that supports operations of multiple racks in accordance with a rack equipment environmental policy plan. Master environmental condition adjustment component 150 also receives equipment rack policy related information from power utility 191 and information processing clients 192 and 193. Access sensor 145 senses when someone enters or leaves the area in which rack equipment environmental condition adjustment system 100 is located and notifies master environmental condition adjustment component 150. HVAC controller 140 controls the heating, venting and cooling equipment associated with an area in which equipment racks 110, 120 and 130 are located. For example, HVAC controller 140 controls fan 141, heater 142 and an air conditioning unit (not shown) that vent, heat, and cool the area (e.g., a room) in which equipment racks 110, 120 and 130 are located.

The communication links included in the rack equipment environmental condition adjustment system 100 communicate information between components of system 100. Communication link 151 communicatively couples environmental condition adjustment component 115 to other equipment (e.g., server 111, 113 and 114 and disk array 112) in rack 110 (e.g., server 111, 113 and 114 and disk array 112). Communication link 152 communicatively couples environmental condition adjustment component 125 to other equipment in rack 120. Communication link 153 communicatively couples environmental condition adjustment component 135 to other equipment in rack 130. Communication link 155 communicatively couples master environmental condition adjustment control center 150, environmental condition adjustment components 115, 125, and 135, access sensor 145 and HVAC controller 140. There are a variety of configurations that are compatible with present invention communication links. A present invention communication link can be established by "injecting" (e.g., modulating) a signal on a power cord (e.g., AC or DC line cord), an RS-485 system an Ethernet 10/100/1000bT local area network (LAN) and/or wireless communications channels.

Environmental condition adjustment components 115, 125, 135 and master environmental condition adjustment component 150 adjust rack equipment and rack area support equipment in accordance with policies and objectives of a rack equipment environmental policy plan. The rack equipment environmental policy plan facilitates imposition of predetermined rack equipment operation condition based upon environmental conditions. The environmental condition adjustment components analyze the policy information in conjunction with equipment description information to formulate commands that direct actions on the equipment in racks 110, 120 and 130 and related support equipment. For example, the commands can direct modulation of operation settings and performance levels of the rack equipment. In one embodiment, the environmental condition adjustment components direct changes in environmental conditions to maintain rack equipment operation within the power consumption and heat dissipation budget. The adjustments in environmental conditions facilitate maximization of tradeoffs between performance and power consumption/thermal. The rack equipment environmental policy plan can be dynamically adjusted on the fly.

With reference still to FIG. 1, there are a variety of ways in which master environmental condition adjustment component 150 and environmental condition adjustment components 115, 125 and 135 adjust equipment included in rack equipment environmental condition adjustment 100. For example, environmental condition adjustment components 115, 125 and 135 can direct adjustments in the frequency and operating voltage characteristics of equipment included in racks 110 through 130 respectively. Environmental condition adjustment components 115, 125 and 135 can also instruct equipment included in racks 110 through 130 respectively to turn on or off. Alternatively environmental condition adjustment components 115, 125 and 135 can instruct execution components (e.g., parallel processors, pipelines, etc.) and/or portions of a memory component (e.g., a disk array, etc.) to turn on or off.

Master environmental condition adjustment component 150 and environmental condition adjustment components 115, 125 and 135 can also direct adjustments for support equipment (e.g., fan 141, heater 142, etc.). The adjustments in support equipment can alter the ambient environmental conditions of the rack equipment. For example, master environmental condition adjustment component 150 can instruct HVAC controller to increase cooling air supplied by an air conditioner thus reduce the ambient temperature of the rack equipment area. In one exemplary implementation, reducing the temperature of the rack equipment area enables the rack equipment to dissipate more heat at a faster rate and thus permits the performance level settings (e.g., clock frequency and/or voltage) of the rack equipment to be increased.

Environmental condition adjustment components (e.g., 115, 125, 135 and/or 150) can also comprise an interface for facilitating user interaction with rack equipment adjustments based upon environmental conditions. The interface allows operators or other equipment (e.g., remote resources coupled via a network) to manually and/or automatically participate in environmental condition adjustment for rack equipment. The interface is a mechanism for communicating information to and from an operator or user. For example, the interface can enable operator intervention and provides a variety of environmental condition and performance related information in a cohesive, user friendly presentation.

Figure 2:
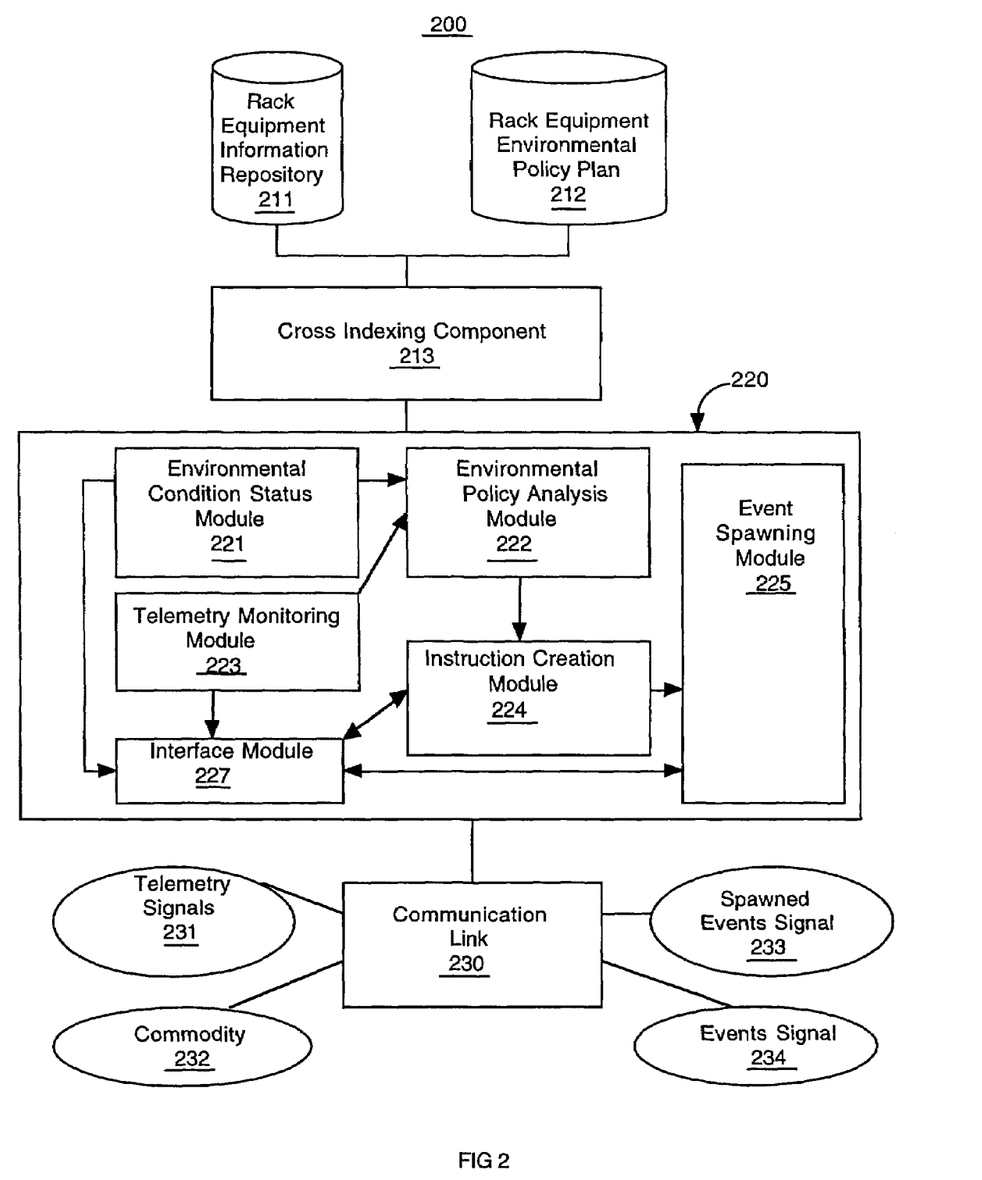
FIG. 2 is an illustration of one exemplary present invention environmental condition adjustment component.

FIG. 2 is an illustration of environmental condition adjustment component 200, one embodiment of a present invention environmental condition adjustment component. Environmental condition adjustment component 200 includes rack equipment information repository 211, rack equipment environmental policy plan repository 212, cross indexing component 213, environmental control processing component 220, and communication component 230. The components of environmental condition adjustment component 200 cooperatively operate to control environmental conditions based upon environmental condition policies. Equipment information repository 211 stores information about equipment included in the rack (e.g., rack equipment description information). Rack equipment environmental policy plan repository 212 stores information on environmental control plans (e.g., policy guidelines and management plan objectives). Cross indexing component 213 correlates equipment information and environmental condition policy information. Environmental control processing component 220 processes instructions for controlling activities associated with environmental conditions. Environmental condition adjustment component 200 utilizes communication link 230 for external communications. For example, environmental condition adjustment component 200 utilizes communication link 230 to forward and receive telemetry signals 231, commodity signals 232, spawned event signals 233 and trigger event signals 234.

In one embodiment, management processing component 220 includes environmental condition status module 221, environmental policy analysis module 222, telemetry monitoring module 223, instruction creation module 224, event spawning module 225 and interface module 227. Environmental condition status module 221 ascertains the status of an environmental condition of the rack equipment. Environmental policy analysis module 222 analyzes environmental policy information associated with the environmental condition of the rack equipment. Telemetry monitoring module 223 monitors characteristics and activity of the rack equipment's environmental conditions. Instruction creation module 224 creates operation instructions directed to achieving compliance with the analysis of the environmental policy information. Event spawning module 225 generates environmental trigger events. Interface module 227 performs interface operations.

Environmental condition status module 221 can ascertain the status of a variety of environmental conditions. If environmental condition status module 221 recieves an indication of an environmental condition change or triggering event, environmental condition status module 221 sends an indication of the environmental change to environmental policy analysis module 222 for analysis and processing. For example, environmental condition status module 221 can notice indications of temperature changes around an equipment rack and forwards notification of the change to environmental policy analysis module 222. Environmental condition status module 221 can receive the notice from telemetry monitoring module 223 and can determine if the telemetry information indicates the occurrence of a change in an environmental condition (e.g., related to a policy action and/or management objective).

Environmental policy analysis module 222 can analyze a variety of different environmental condition policy objectives in response to an environmental condition change indication. The environmental policy analysis module 222 can determine appropriate actions for implementing the environmental condition objectives. For example, the environmental policies can be structured in accordance with regulatory requirements and/or the environmental policy can be interactive. The environmental policy analysis module 222 can determine if the occurrence of a particular environmental condition change (e.g., detected by environmental condition status module 221) triggers a corrective actions to the environment (e.g., return to its prior condition and/or a condition indicated in an environmental condition policy objective). The environmental policy analysis module 222 can also determine if actions or corrections to environmental conditions are limited by policy constraints. For example, environmental policy analysis module 222 can determine if a power consumption and heat dissipation budget limit environmental objective actions or if any of the policies contradict or limit each other. The environmental policy analysis module 222 provides an indication of the action (e.g., a temperature change) to instruction creation module 224.

Telemetry collection module 223 can be utilized to direct the collection of telemetry information associated with various different environmental conditions. For example, telemetry collection module 223 is readily adaptable for utilization with different environmental support related devices, including different types and brands of heating units, ventilating units and air conditioning units. Telemetry collection module 223 is also readily adaptable for utilization with a variety of different rack equipment. Telemetry collection module 223 can also direct collection or retrieval of information for confirming environmental condition and/or performance adjustment commands are complied with. Telemetry module 223 can also direct retrieval of rack equipment description information (e.g., rack equipment operation settings and performance levels) and support equipment (e.g., HVAC units).

Instruction creation module 224 is capable of creating a variety of different instructions in response to notifications received from environmental policy analysis module 222. Instruction creation module 224 can extract instruction protocol and syntax requirements from rack equipment description information (e.g., included in a rack equipment repository). The instructions can direct a change in rack equipment and/or support equipment operating settings. For example, the instructions can direct a change in a temperature setting of HVAC support equipment and/or heat dissipation level for the rack equipment. The instructions can include a command to change the operating frequency, voltage of supply power or turn on/off rack equipment and/or support equipment (e.g., fan 141, heater 142, auxiliary power unit 171, etc.). The operation adjustment instructions can be forwarded to rack equipment and associated environmental support equipment. For example, instruction creation module 224 can forward operation adjustment instructions to alter the environmental temperature of the rack equipment.

Event spawning module 225 spawns environmental condition trigger events. Event spawning module 225 can spawn an environmental triggering event that causes an environmental condition adjustment component to interface with other environmental condition adjustment components and/or rack equipment under the control of other environmental condition adjustment components, clients, and/or external support operations (e.g., a power utility). For example, master environmental condition adjustment component 150 can receive indications of an environmental change from venting and cooling (HVAC) controller 140 and spawn a triggering event indication to environmental condition adjustment component 115, 125 and/or 135. Conversely, environmental condition adjustment components 115, 125 and 135 can spawn a triggering event requesting more cooling or heating that causes master environmental condition adjustment component 150 to direct venting and cooling (HVAC) controller 140 to increase or decrease the temperature in accordance with a predetermined environmental policy.

In one embodiment of the present invention, an environmental condition adjustment component (e.g., 115) is included in an intelligent power distribution unit (IPDU). The IPDU can be utilized to aggregate multiple power line cords from rack equipment into a smaller number of power line cords at a rack level. In an implementation in which power cords are used as a present invention communication link, the presence of each piece of rack equipment can be detected as the rack equipment is communicatively coupled to the IDPU. In addition, information associated with the piece of rack equipment (e.g., power and thermal performance operating points, information indicating the type of rack equipment, characteristics of the rack equipment, etc.) can be automatically communicated to the IPDU. Even if a piece of rack equipment does not have an available relevant descriptive information store itself, the IPDU can sense current draw and account for unregulated use in equipment rack management policy decisions.

Figure 3:
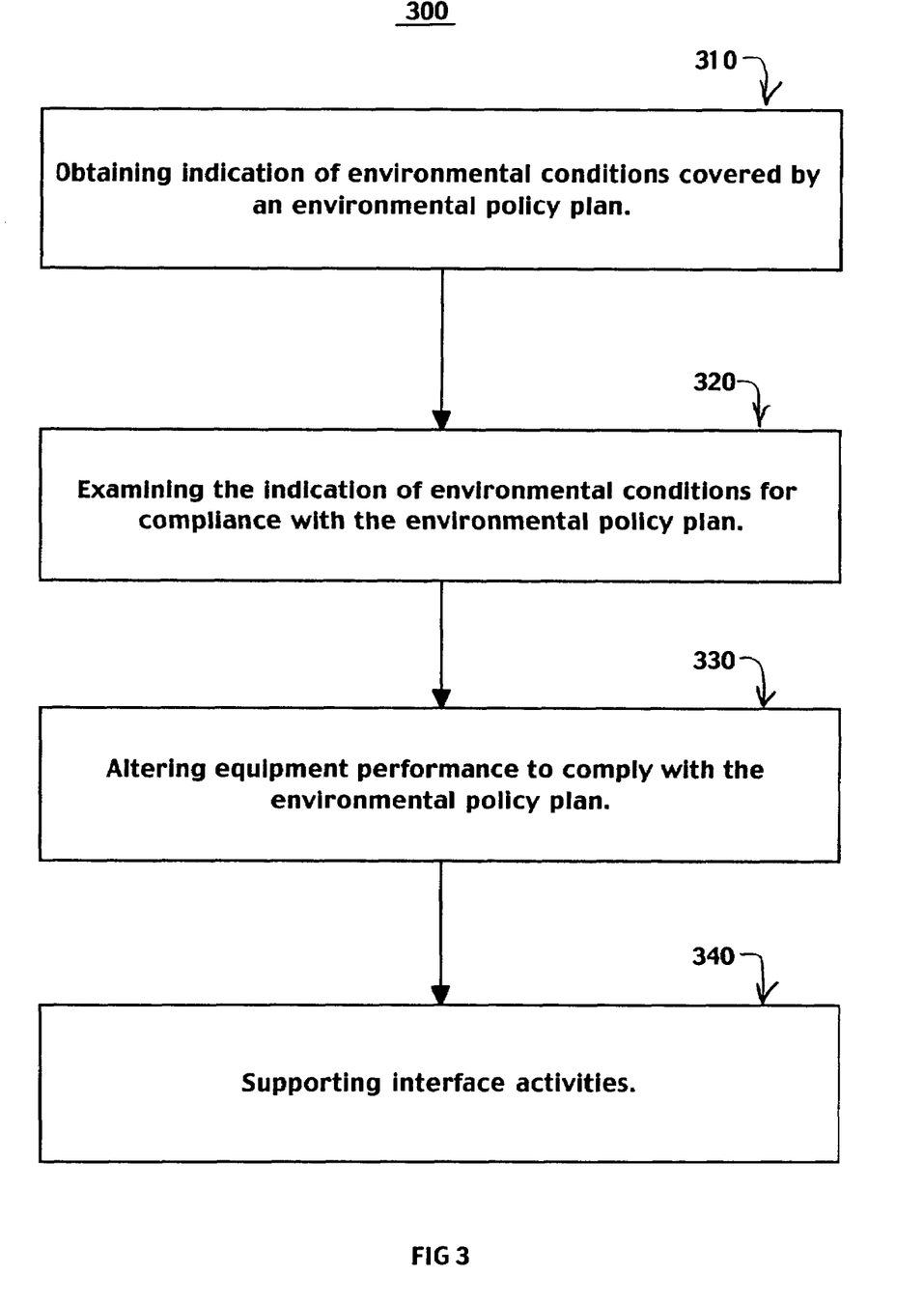
FIG. 3 is a flow chart of an environmental condition response method in accordance with one embodiment of the present invention.

FIG. 3 is a flow chart of environmental condition response method 300, an environmental condition response method in accordance with one embodiment of the present invention. Environmental condition response method 300 establishes a communication and control protocol for automatic adjustment of rack equipment based upon environmental conditions. The communication and control protocol also facilitates manipulation of rack equipment operation and performance in accordance with a rack equipment environmental plan or policies. Rack equipment management method 300 also provides an interface for presenting information in a convenient manner to a user.

In step 310, indication of environmental conditions covered by an environmental policy plan are obtained. The information can include an indication of a rack equipment environmental trigger event. For example, the information can include an indication of a variation in the ambient temperature of the rack equipment, the ambient noise level surrounding the rack equipment, etc. The information received in step 310 can include environment description information and/or information related to rack environmental support operations (e.g., a temperature level being maintained by an venting or heating component).

The indication of environmental conditions is examined for compliance with an environmental policy plan in step 320. In one implementation, the examination compares the information received in step 310 to an environmental management action set forth in an environmental policy plan for a particular trigger event indicated by information received in step 320. For example, the examination can include determining appropriate adjustment setting for rack equipment (e.g., heat dissipation settings) and/or environmental support equipment (e.g., air conditioning setting). The examination can also determine possible actions available for a particular piece of rack equipment. For example, possible operation setting and/or performance level changes. In one exemplary implementation the environmental policy plan maintains environmental conditions within safety constraints (e.g., noise levels that do not injure workers, thermal levels that do not induce breakdown of equipment, etc.).

At step 330, equipment performance is altered to comply with the environmental policy plan. The equipment can include rack equipment and environmental support equipment. The equipment performance alteration is directed to bring the environmental conditions within an environmental policy plan. In one exemplary implementation, performance alteration instructions are forwarded to the rack equipment and the response of the equipment is investigated. The alteration of the equipment performance levels can change the power consumption and thermal load of the rack equipment. For example, the alteration of the equipment performance levels can result in an increase or decreasing in the heat dissipated by the rack. In another example, the manipulation can include turning on and off the equipment. The directing can also include issuing a command to manipulate operation of equipment associated with controlling environmental conditions (e.g., HVAC equipment).

In step 340, interface activities are supported. The interface activities include presenting information in a convenient and user friendly manner. For example, environmental condition information, corresponding rack equipment description information and telemetry information (e.g., operating level settings) can be displayed. Similar information associated with rack support equipment (e.g., HVAC equipment, auxiliary power, etc.) can also be presented. The interface activities also include automatically adjusting the environmental plan interactively.

Figure 4:
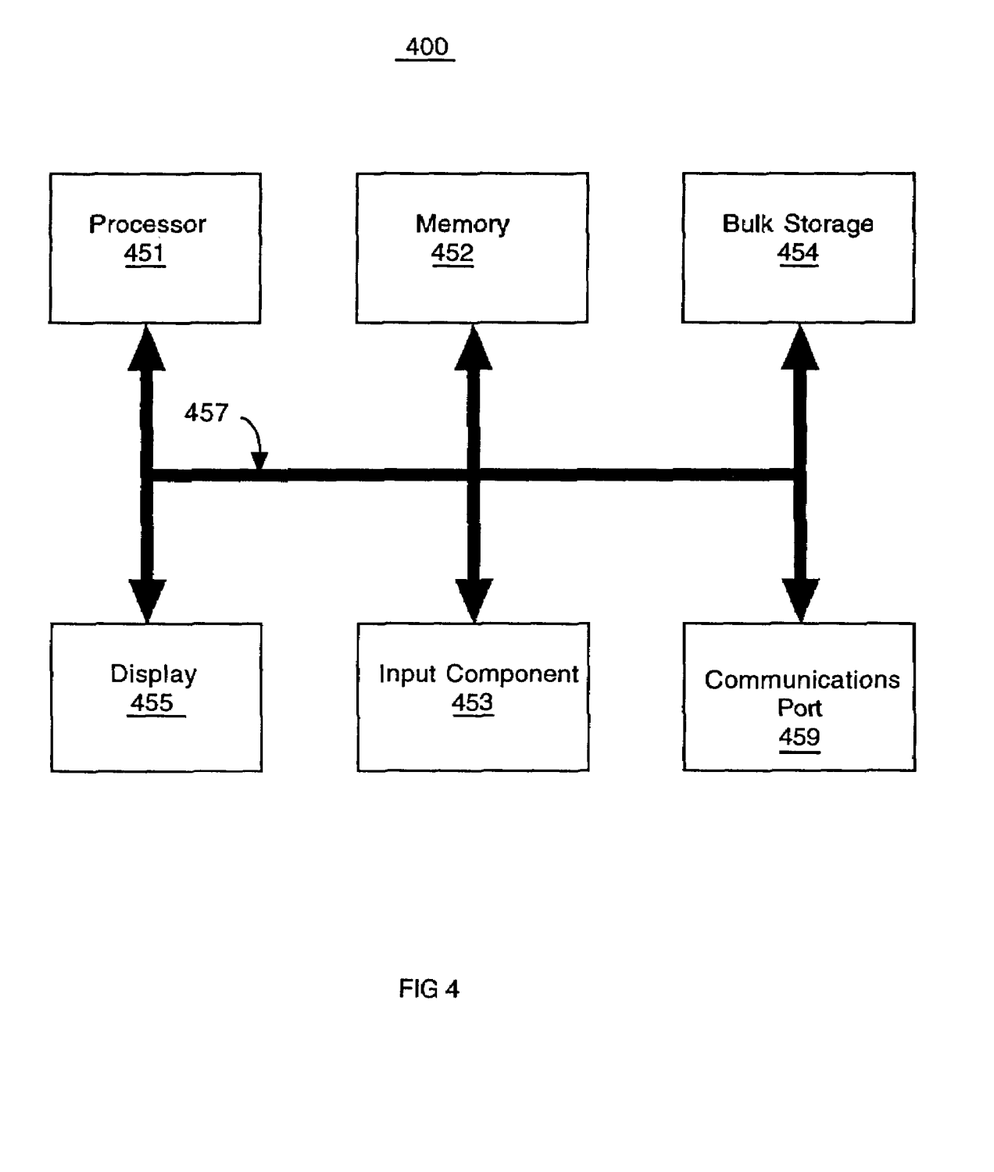
FIG. 4 is a block diagram of one embodiment of a computer system on which a present invention system and method can be implemented.

FIG. 4 is a block diagram of computer system 400, one embodiment of a computer system on which the present invention can be implemented. For example, computer system 400 can be utilized to implement management processing component 220 or rack equipment management method 300. Computer system 400 includes communication bus 457, processor 451, memory 452, input component 453, bulk storage component 454 (e.g., a disk drive), network communication port 459 and display module 455. Communication bus 457 is coupled to central processor 451, memory 452, input component 453, bulk storage component 454, network communication port 459 and display module 455.

The components of computer system 400 cooperatively function to provide a variety of functions, including performing rack equipment management in accordance with the present invention. Communication bus 457 communicates equipment rack management related information within computer system 400. Processor 451 processes information and instructions, including instructions and information for managing rack equipment (e.g., processor 451 processes event monitoring module 221 instructions, policy engine module 222 instructions, telemetry collection module 223 instructions, command generation module 224 instructions, etc.). Memory 452 stores information and instructions, including instructions for implementing a rack equipment management plan. Bulk storage component 454 also provides storage of information (e.g., rack equipment description information, policy information, etc.). One embodiment of a present interface can be implemented by input component 453, display module 455 and network communications port 459. Input component 453 facilitates communication of information (e.g., operator policy initiated changes, operator entered rack equipment description information, operator intervention in management actions, etc.) to computer system 400. Display module 455 displays information to a user (e.g., a graphical user interface conveying rack equipment operation settings and performance levels, rack equipment description information, policy information, correlation between the information, etc.). Network communication port 459 provides a communication port for communicatively coupling with a network (e.g., for communicating with a client, a utility, a remote operator and/or control center, etc.).

Thus, a present invention rack equipment management system and method facilitates convenient and efficient management of information processing support activities based upon a rack equipment management plan. The rack equipment management plan permits automated implementation of rack equipment policies and associated management objectives. Automatic direction of equipment operation setting and performance level adjustments is provided to meet the rack equipment management objectives (e.g. power consumption and heat dissipation levels). Equipment description information, policy information and rack equipment management commands are automatically communicated via communication links implementing a rack equipment management protocol. The communication links are flexibly adaptive to a variety of implementations and can be implemented on an available communication medium (e.g., power cord lines). The present invention also provides a convenient and efficient interface that can correlate diverse rack equipment management information in a unified manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the claims appended hereto and their equivalents.

What is claimed is:

1. A rack equipment environmental condition adjustment system comprising:
   rack equipment for processing information;
   an environmental condition adjustment component for adjusting said rack equipment based upon environmental conditions; and
   a communication bus for communicatively coupling said rack equipment and said environmental condition adjustment component, wherein said communication bus communicates information between said environmental condition adjustment component and said rack equipment.

2. A rack equipment environmental condition adjustment system of claim 1 wherein the performance of said rack equipment is adjusted.

3. A rack equipment environmental condition adjustment system of claim 1 wherein said environmental condition adjustment component directs adjustments in the frequency and voltage operating characteristics of said rack equipment.

4. A rack equipment environmental condition adjustment system of claim 1 wherein an environmental policy plan imposes predetermined rack equipment operating conditions based upon environmental conditions.

5. A rack equipment environmental condition adjustment system of claim 1 wherein said environmental condition adjustment component directs adjustment of environmental support equipment.

6. A rack equipment environmental condition adjustment system of claim 1 wherein an environmental policy plan is dynamically adjustable.

7. A rack equipment environmental condition adjustment system of claim 1 wherein said environmental condition adjustment component ensures said adjustments are compatible with maintenance of a rack equipment thermal budget.

8. An environmental condition response method comprising:
   obtaining indication of environmental conditions covered by an environmental policy plan;
   examining said indication of environmental conditions for compliance with said environmental policy plan; and
   altering equipment performance to comply with said environmental policy plan.

9. An environmental condition response method of claim 8 wherein said equipment includes rack equipment and environmental support equipment.

10. An environmental condition response method of claim 8 wherein said altering is executed by turning off said equipment.

11. An environmental condition response method of claim 8 further comprising:
  forwarding performance alteration instructions to said equipment; and
  investigating response of said equipment.

12. An environmental condition response method of claim 8 wherein said environmental policy plan maintains environmental conditions within safety constraints.

13. An environmental condition response method of claim 8 further comprising automatically adjusting said environmental plan interactively.

14. A computer usable storage medium having computer readable program code embodied therein for causing a computer system to implement environmental response instructions comprising:
  an environmental condition status module for ascertaining status of an environmental condition of rack equipment;
  an environmental policy analysis module for analyzing environmental policy information associated with said environmental condition; and
  an instruction creation module for creating operation instructions directed to achieving compliance with analysis of said environmental policy information.

15. A computer usable storage medium of claim 14 further comprising an event spawning module for generating environmental trigger events.

16. A computer usable storage medium of claim 14 further comprising a telemetry monitoring module for monitoring characteristics and activity of said rack equipment.

17. A computer usable storage medium of claim 14 wherein said operation adjustment instructions are forwarded to rack equipment and associated environmental support equipment.

18. A computer usable storage medium of claim 14 wherein said instruction creation module forwards operation adjustment instructions to alter the environmental temperature of said rack equipment.

19. A computer usable storage medium of claim 14 wherein said environmental policies are structured in accordance with regulatory requirements.

20. A computer usable storage medium of claim 14 wherein said environmental policy is interactive.

* * * * *

UNITED STATES PATENT AND TRADEMARK OFFICE
CERTIFICATE OF CORRECTION

PATENT NO. : 7,039,539 B2  Page 1 of 1
APPLICATION NO. : 10/681720
DATED : May 2, 2006
INVENTOR(S) : Ricardo Espinoza-Ibarra et al.

It is certified that error appears in the above-identified patent and that said Letters Patent is hereby corrected as shown below:

ON THE TITLE PAGE

On the Title Page, after "(75) Inventors:" delete "Ricard Espinoza-Ibarra" and insert therefor --Ricardo Espinoza-Ibarra--

Signed and Sealed this

Sixteenth Day of October, 2007

JON W. DUDAS
*Director of the United States Patent and Trademark Office*